(12) United States Patent
Balasubramonian et al.

(10) Patent No.: US 7,490,220 B2
(45) Date of Patent: Feb. 10, 2009

(54) MULTI-CLUSTER PROCESSOR OPERATING ONLY SELECT NUMBER OF CLUSTERS DURING EACH PHASE BASED ON PROGRAM STATISTIC MONITORED AT PREDETERMINED INTERVALS

(76) Inventors: Rajeev Balasubramonian, 11147 O'Henry Rd., Sandy, UT (US) 84070; Sandhya Dwarkadas, 1111 Lac de Ville Blvd., #411, Rochester, NY (US) 14618; David Albonesi, 7 Estates Dr., Ithaca, NY (US) 14850

( * ) Notice: Subject to any disclaimer, the term of this patent is extended or adjusted under 35 U.S.C. 154(b) by 36 days.

(21) Appl. No.: 11/147,392

(22) Filed: Jun. 8, 2005

(65) Prior Publication Data

US 2006/0106923 A1 May 18, 2006

Related U.S. Application Data

(60) Provisional application No. 60/577,607, filed on Jun. 8, 2004.

(51) Int. Cl.
 *G06F 15/80* (2006.01)

(52) U.S. Cl. .......................................... 712/32; 717/158
(58) Field of Classification Search ....................... None
  See application file for complete search history.

(56) References Cited

U.S. PATENT DOCUMENTS

| | | | | |
|---|---|---|---|---|
| 6,026,479 | A * | 2/2000 | Fisher et al. ................... | 712/24 |
| 6,836,839 | B2 | 12/2004 | Master et al. ................... | 712/29 |
| 2004/0103263 | A1 * | 5/2004 | Colavin et al. ................. | 712/15 |
| 2004/0111708 | A1 * | 6/2004 | Calder et al. ................. | 717/131 |
| 2005/0071694 | A1 * | 3/2005 | Gonzalez et al. ............. | 713/300 |
| 2005/0278555 | A1 * | 12/2005 | Chaparro et al. ............ | 713/300 |

* cited by examiner

*Primary Examiner*—Kenneth S Kim
(74) *Attorney, Agent, or Firm*—Stolowitz Ford Cowger LLP

(57) ABSTRACT

In a processor having multiple clusters which operate in parallel, the number of clusters in use can be varied dynamically. At the start of each program phase, the configuration option for an interval is run to determine the optimal configuration, which is used until the next phase change is detected. The optimum instruction interval is determined by starting with a minimum interval and doubling it until a low stability factor is reached.

12 Claims, 7 Drawing Sheets

MULTI-CLUSTER PROCESSOR OPERATING ONLY SELECT NUMBER OF CLUSTERS DURING EACH PHASE BASED ON PROGRAM STATISTIC MONITORED AT PREDETERMINED INTERVALS

REFERENCE TO RELATED APPLICATION

The present application claims the benefit of U.S. Provisional Patent Application No. 60/577,607, filed Jun. 8, 2004, whose disclosure is hereby incorporated by reference in its entirety into the present application.

STATEMENT OF GOVERNMENT INTEREST

The work leading to the present invention was supported in part by NSF grants EIA-0080124, CCR-9811929, CCR-9988361, CCR-0219848, and ECS-0225413; by DARPA/ITO under AFRL contract F29601-00-K-0182; and by the U.S. Department of Energy Office of Inertial Confinement Fusion under Cooperative Agreement No. DE-FC03-92SF19460. The government has certain rights in the invention.

FIELD OF THE INVENTION

The present invention is directed to a method for managing the operation of a clustered processor and more specifically to a method for dynamically managing the communication-parallelism trade-off in a clustered processor.

Description of Related Art

The extraction of large amounts of instruction-level parallelism (ILP) from common applications on modern processors requires the use of many functional units and large on-chip structures such as issue queues, register files, caches, and branch predictors. As CMOS process technologies continue to shrink, wire delays become dominant (compared to logic delays). This, combined with the continuing trend towards faster clock speeds, increases the time in cycles to access regular on-chip structures (caches, register files, etc.). Not only does this degrade instructions per cycle (IPC) performance, but it also presents various design problems in breaking up the access into multiple pipeline stages. In spite of the growing numbers of transistors available to architects, it is becoming increasingly difficult to design large monolithic structures that aid ILP extraction without increasing design complexity, compromising clock speed, and limiting scalability in future process technologies.

A potential solution to these design challenges is a clustered microarchitecture in which the key processor resources are distributed across multiple clusters, each of which contains a subset of the issue queues, register files, and the functional units. In such a design, at the time of instruction rename, each instruction is steered into one of the clusters. As a result of decreasing the size and bandwidth requirements of the issue queues and register files, the access times of these cycle-time critical structures are greatly reduced, thereby permitting a faster clock. The simplification of these structures also reduces their design complexity.

An attractive feature of a clustered microarchitecture is the reduced design effort in producing successive generations of a processor. Not only is the design of a single cluster greatly simplified, but also, once a single cluster core has been designed, more of these cores can be put into the processor for a low design cost (including increasing front-end bandwidth) as the transistor budget increases. Adding more clusters could potentially improve IPC performance because each program has more resources to work with. There is little effect if any on clock speed from doing this as the implementation of each individual cluster does not change. In addition, even if the resources in a large clustered processor cannot be effectively used by a single thread, the scheduling of multiple threads on a clustered processor can significantly increase the overall instruction throughput. The relatively low design complexity and the potential to exploit thread-level parallelism make a highly-clustered processor in the billion transistor era an extremely attractive option.

The primary disadvantage of clustered microarchitectures is their reduced IPC compared to a monolithic design with identical resources. Although dependent instructions within a single cluster can issue in successive cycles, extra inter-cluster bypass delays prevent dependent instructions that lie in different clusters from issuing in successive cycles. While monolithic processors might use a potentially much slower clock to allow a single-cycle bypass among all functional units, a clustered processor allows a faster clock, thereby introducing additional latencies in cycles between some of the functional units. The clustered design is a viable option only if the IPC degradation does not offset the clock speed improvement.

Modern processors like the Alpha 21264 at $0.35\mu$ technology already employ a limited clustered design, wherein the integer domain, for example, is split into two clusters. A number of recent studies have explored the design of heuristics to steer instructions to clusters. Despite these advances, the results from these studies will likely need to be reconsidered in the near future for the following reasons.

1. Due to the growing dominance of wire delays and the trend of increasing clock speeds, the resources in each cluster core will need to be significantly reduced relative to those assumed in prior studies.

2. There will be more clusters on the die than assumed in prior studies due to larger transistor budgets and the potential for exploiting thread-level parallelism.

3. The number of cycles to communicate data between the furthest two clusters will increase due to the wire delay problem. Furthermore, communication delays will be heterogeneous, varying according to the position of the producer and consumer nodes.

4. The data cache will need to be distributed among clusters, unlike the centralized cache assumed by most prior studies, due to increased interconnect costs and the desire to scale the cache commensurately with other cluster resources.

While the use of a large number of clusters could greatly boost overall throughput for a multi-threaded workload, its impact on the performance of a single-threaded program is not as evident. The cumulative effect of the above trends is that clustered processors will be much more communication bound than assumed in prior models. As the number of clusters on the chip increases, the number of resources available to the thread also increases, supporting a larger window of in-flight instructions and thereby allowing more distant instruction-level parallelism (ILP) to be exploited. At the same time, the various instructions and data of the program get distributed over a larger on-chip space. If data has to be communicated across the various clusters frequently, the performance penalty from this increased communication can offset any benefit derived from the parallelism exploited by additional resources.

A number of proposals based on clustered processors have emerged over the past decade. These differ in the kinds of resources that get allocated, the instruction steering heuristics, and the semantics for cross-cluster communication. The cache is a centralized structure in all these models. These studies assume a small number of total clusters with modest communication costs.

Many recent bodies of work have looked at hardware units with multiple configuration options and algorithms for picking an appropriate configuration at run-time. Many of these algorithms are interval-based, in that, they monitor various statistics over a fixed interval of instructions or cycles and make configuration decisions based on that information. Adaptation at subroutine boundaries can be more effective than using fixed instruction intervals.

Various recent works have proposed run-time algorithms for the dynamic tuning of hardware to a program phase's requirements. Most of these techniques use an interval-based algorithm, where measurements over the last few intervals dictate the choice of configuration over subsequent intervals, where an interval is a pre-specified number of committed instructions.

Processors in future generations are likely to suffer from lower IPCs because of the high cost of wire delays.

SUMMARY OF THE INVENTION

It is an object of the invention to overcome the deficiencies of the prior art.

To achieve the above and other objects, the present invention is directed to a dynamically tunable clustered architecture that optimizes the communication-parallelism trade-off for improved single-threaded performance in the face of the above trends. The balance is effected by employing only a subset of the total number of available clusters for the thread.

Our results show that the performance trend as a function of the number of clusters varies across different programs depending on the degree of distant ILP present in them. We have therefore developed dynamic algorithms that identify the optimal number of clusters for any program phase and match the hardware to the program's requirements. We present algorithms that vary the number of active clusters at any program point and show that a simple algorithm that looks at performance history over the past few intervals often yields most of the available performance improvements. However, such an algorithm misses fine-grained opportunities for reconfiguration, and we present alternative techniques that invest more hardware in an attempt to target these missed opportunities. The simple interval-based algorithm provides overall improvements of 11%, while the fine-grained techniques are able to provide 15% improvements over the best static organization.

Disabling a subset of the clusters for a given program phase in order to improve single-threaded performance has other favorable implications. Entire clusters can turn off their supply voltage, thereby greatly saving on leakage energy, a technique that would not have been possible in a monolithic processor. Alternatively, these clusters can be used by (partitioned among) other threads, thereby simultaneously achieving the goals of optimal single and multithreaded throughput.

We have presented and evaluated the effects of shrinking process technologies and dominating wire delays on the design of future clustered processors. While increasing the number of clusters to take advantage of the increasing chip densities improves the processor's ability to support multiple threads, the performance of a single thread can be adversely affected. This is because such processors are bound by cross-cluster communication costs. These costs can tend to dominate any increased extraction of instruction-level parallelism as the processor is scaled to large numbers of clusters. We have demonstrated that dynamically choosing the number of clusters using an exploration-based approach at regular intervals is effective in optimizing the communication-parallelism trade-off for a single thread. It is applicable to almost every program and yields average performance improvements of 11% over our base architecture. In order to exploit phase changes at a fine grain, additional hardware has to be invested, allowing overall improvements of 15%. Since 8.3 clusters, on average, are disabled by the reconfiguration schemes, there is the potential to save a great deal of leakage energy in single-threaded mode. The throughput of a multi-threaded workload can also be improved by avoiding cross-thread interference by dynamically dedicating a set of clusters to each thread. We have verified the validity of our results for a number of interesting processor models, thus highlighting the importance of the management of the communication-parallelism trade-off in future processors.

Ours is the first proposal that identifies the importance of a variable-length instruction interval and incorporates this in the selection algorithm. We are also the first to look at fine-grained reconfiguration at branch boundaries and contrast it with interval-based schemes. Ours is the first study to focus on a single process technology and examine the effects of adding more resources. The clustered processor model exposes a clear trade-off between communication and parallelism, and it readily lends itself to low-cost reconfiguration.

BRIEF DESCRIPTION OF THE DRAWINGS

A preferred embodiment of the present invention and variations thereon will be disclosed with reference to the drawings, in which.

DETAILED DESCRIPTION OF THE PREFERRED EMBODIMENT

Figure 1:
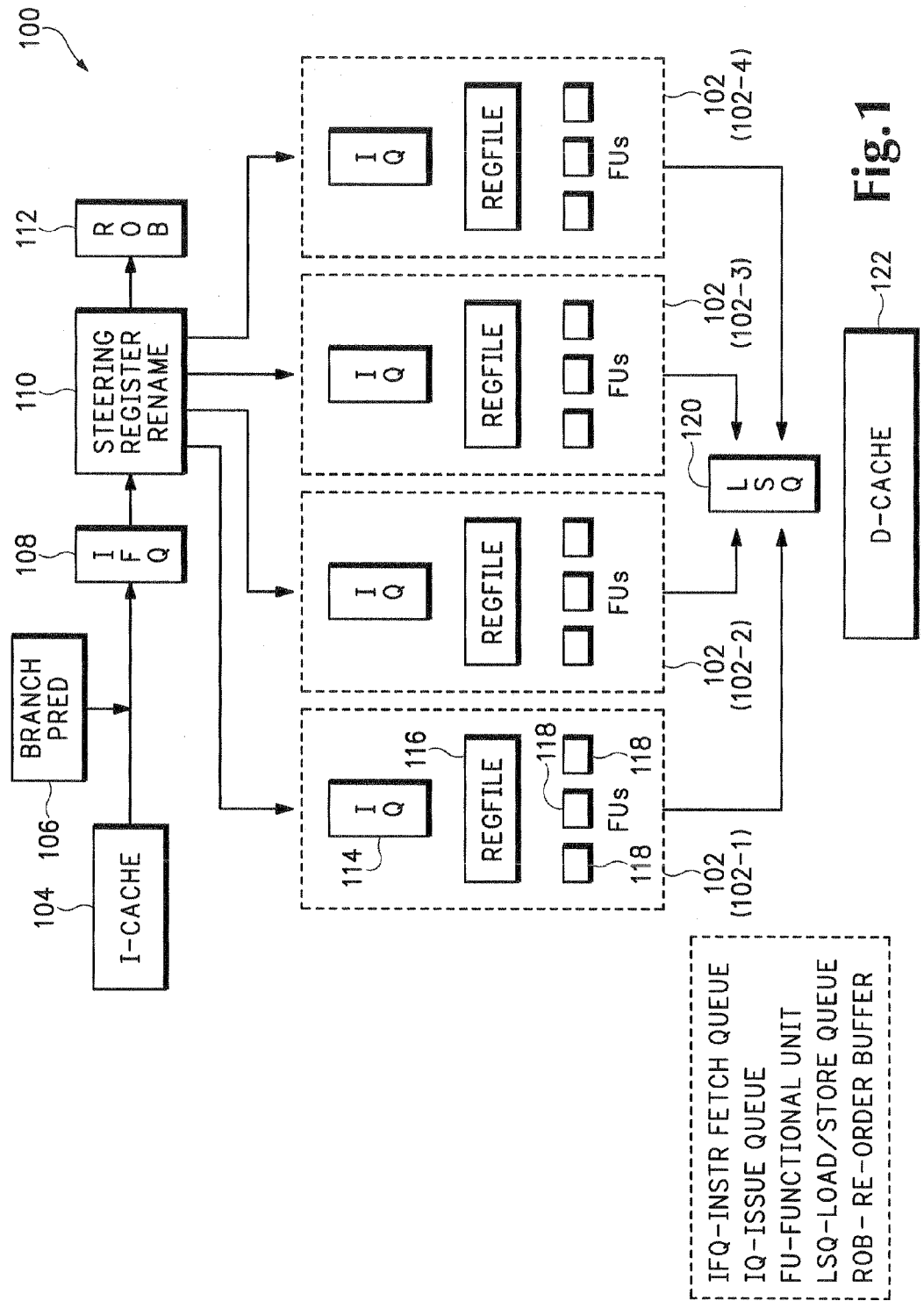
FIGS. 1 and 2 are block diagrams showing two clustered processor configurations in which the preferred embodiment can be implemented.

A preferred embodiment of the present invention and variations thereon will be described in detail with reference to the drawings, in which like reference numerals refer to like elements throughout.

We start by describing a baseline clustered processor model that has been commonly used in earlier studies. Such a model is shown in FIG. 1 as 100, with four clusters 102 (individually designated 102-1, 102-2, 102-3, and 102-4). Upstream from the four clusters 102 are an instruction cache 104, a branch predictor 106, an instruction fetch cache 108, a steering register rename unit 110, and a reorder buffer 112. Within each cluster 102 are an issue queue 114, a register file 116, and functional units 118. Downstream from the clusters 102 are a load/store queue (LSQ) 120 and a data cache 122.

The branch predictor 106 and instruction cache 104 are centralized structures, just as in a conventional processor. At the time of register renaming in the steering register rename unit 110, each instruction gets assigned to a specific cluster. Each cluster 102 has its own issue queue 114, register file 116, a set of functional units 118, and its own local bypass network. Bypassing of results within a cluster does not take additional cycles (in other words, dependent instructions in the same cluster can issue in successive cycles). However, if the consuming instruction is not in the same cluster as the producer, it has to wait additional cycles until the result is communicated across the two clusters.

A conventional clustered processor distributes only the register file 116, issue queue 114, and the functional units 118 among the clusters 102. The data cache 122 is centrally located. An alternative organization distributes the cache among the clusters, thereby making the design more scalable, but also increasing the implementation complexity. Since both organizations are attractive design options, we evaluate the effect of dynamic tuning on both organizations.

In the traditional clustered designs, once loads and stores are ready, they are inserted into a centralized load-store queue (LSQ) 120. From here, stores are sent to the centralized L1 cache when they commit and loads are issued when they are known to not conflict with earlier stores. The LSQ is centralized because a load in any cluster could conflict with an earlier store from any of the other clusters.

For the aggressive processor models that we are studying, the cache has to service a number of requests every cycle. An efficient way to implement a high bandwidth cache is to make it word-interleaved. For a 4-way word-interleaved cache, the data array is split into four banks and each bank can service one request every cycle. Data with word addresses of the form $4N$ are stored in bank 0, of the form $4N+1$ are stored in bank 1, and so on. Such an organization supports a maximum bandwidth of four and helps minimize conflicts to a bank.

In a processor with a centralized cache, the load latency depends on the distance between the centralized cache and the cluster issuing the load. In our study, we assume that the centralized LSQ and cache are co-located with cluster 102-1. Hence, a load issuing from cluster 102-1 does not experience any communication cost. A load issuing from cluster 102-2 takes one cycle to send the address to the LSQ and cache and another cycle to get the data back (assuming that each hop between clusters takes a cycle). Similarly, cluster 102-3 experiences a total communication cost of four cycles for each load. This is in addition to the few cycles required to perform the cache RAM look-up.

Steering heuristics will now be discussed. A clustered design allows a faster clock, but incurs a noticeable IPC degradation because of inter-cluster communication and load imbalance. Minimizing these penalties with smart instruction steering has been the focus of many recent studies. We use an effective steering heuristic that steers an instruction (and its destination register) to the cluster that produces most of its operands. In the event of a tie or under circumstances where an imbalance in issue queue occupancy is seen, instructions are steered to the least loaded cluster. By picking an appropriate threshold to detect load imbalance, such an algorithm can also approximate other proposed steering heuristics like Mod_N and First_Fit. The former minimizes load imbalance by steering N instructions to one cluster, then steering to its neighbor. The latter minimizes communication by filling up one cluster before steering instructions to its neighbor. We empirically determined the optimal threshold value for load balance. Further, our steering heuristic also uses a criticality predictor to give a higher priority to the cluster that produces the critical source operand. Thus, our heuristic represents the state-of-the-art in steering mechanisms.

In a highly clustered processor, the centralized cache can be a major bottleneck, as it has to support a high bandwidth, and its average distance to the requesting clusters increases. Hence, a distributed cache model represents an attractive design option.

Figure 2:
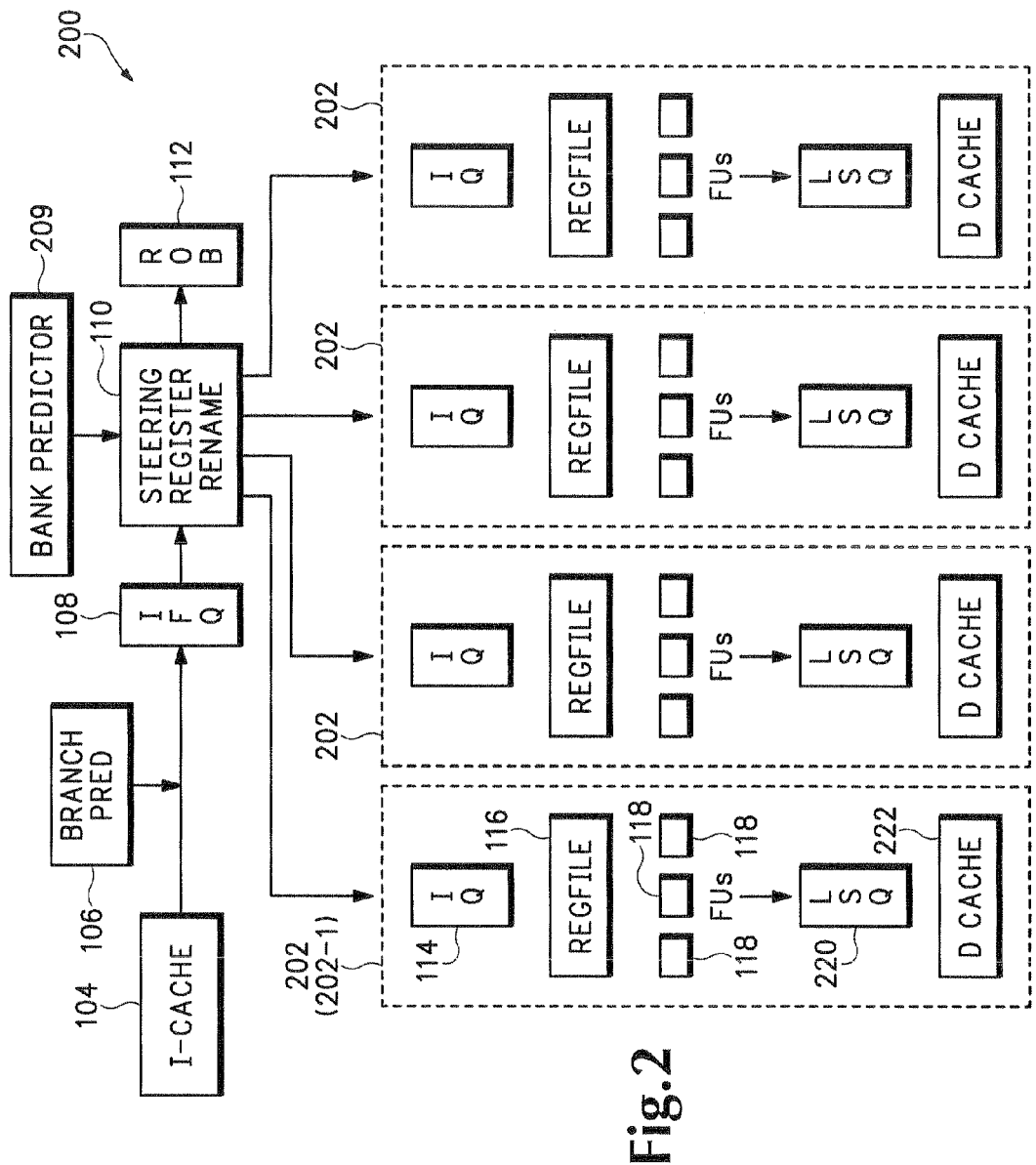

For an N-cluster system, we assume that the L1 cache is broken into N word-interleaved banks. Each bank is associated with its own cluster. The LSQ is also split across the different clusters. The example in FIG. 2 shows an organization with four clusters. The processor model 200 of FIG. 2 differs from the processor model 100 of FIG. 1 in that each cluster 202 includes a distributed LSQ 220 and a distributed data cache 222. Also, a bank predictor 209 is provided. Because the various banks are word-interleaved, they cache mutually exclusive data and do not require any cache coherence protocol between them. The goal of the steering mechanism is to steer a load or store to the cluster that caches the corresponding memory address. We discuss the additional steering complexities arising from the distributed nature of the cache below.

The L2 cache continues to be co-located with cluster 1 (202-1), and a miss in any of the L1 cache banks other than that associated with this cluster incurs additional latency depending on the number of hops.

As process technologies shrink and the number of clusters is increased, attention must be paid to the communication delays and interconnect topology between clusters. Cross-cluster communication occurs at the front-end as well as when communicating register values across clusters or when accessing the cache. Since the former occurs in every cycle, we assume a separate network for this purpose and model non-uniform dispatch latencies as well as the additional latency in communicating a branch mispredict back to the front-end. Since the latter two (cache and register-to-register communication) involve data transfer to/from registers, we assume that the same (separate) network is used.

In the preferred embodiment, we focus on a ring interconnect because of its low implementation complexity. Each cluster is directly connected to two other clusters. We assume two unidirectional rings, implying that a 16-cluster system has 32 total links (allowing 32 total transfers in a cycle), with the maximum number of hops between any two nodes being 8.

Below, as part of our sensitivity analysis, we also show results for a grid interconnect, which has a higher implementation cost but higher performance. The clusters are laid out in a two-dimensional array. Each cluster is directly connected to up to four other clusters. For 16 clusters, there are 48 total links, with the maximum number of hops being 6, thus reducing the overall communication cost.

Our simulator is based on Simplescalar-3.0 for the Alpha AXP instruction set. The simulator has been modified to represent a microarchitecture resembling the Alpha 21264. The register update unit (RUU) is decomposed into issue queues, physical register files, and the reorder buffer (ROB). The issue queue and the physical register file are further split into integer and floating-point. Thus, each cluster in our study is itself decomposed into an integer and floating-point cluster. The memory hierarchy is also modeled in detail (including word-interleaved access, bus and port contention, writeback buffers, etc).

This base processor structure was modified to model the clustered microarchitecture. To represent a wire-delay constrained processor at future technologies, each cluster core was assumed to have one functional unit of each type, 30 physical registers (int and fp, each), and 15 issue queue entries (int and fp, each). As many instructions can issue in a cycle as the number of available functional units. We assume that each hop on the interconnect takes a single cycle. While we did not model a trace cache, we assumed that instructions could be fetched from up to two basic blocks at a time. The important simulation parameters are summarized in Table 1 below.

TABLE I

| | |
|---|---|
| Fetch queue size | 64 |
| Branch predictor | Comb. of bimodal and 2-level |
| Bimodal predictor size | 2048 |
| Level 1 predictor | 1024 entries, history 10 |
| Level 2 predictor | 4096 entries |
| BTB size | 2048 sets, 2-way |
| Branch mispredict penalty | at least 12 cycles |
| Fetch width | 8 (across up to two basic blocks) |
| Dispatch and commit width | 16 |
| Issue queue size | 15 in each cluster (int and fp, each) |
| Register file size | 30 in each cluster (int and fp, each) |
| Re-order Buffer (ROB) size | 480 |
| Integer ALUs/mult-div | 1/1 (in each cluster) |
| FP ALUs/mult-div | 1/1 (in each cluster) |
| L1 I-cache | 32 KB 2-way |
| L2 unified cache | 2 MB 8-way, 25 cycles |
| TLB | 128 entries, 8 KB page size (I and D) |
| Memory latency | 160 cycles for the first chunk |

Our study focuses on wire-limited technologies of the future and we pick latencies according to projections for 0.035µ. We used CACTI-3.0 to estimate access times for the cache organizations. With Simplescalar, we simulated cache organizations with different size and port parameters (and hence different latencies) to determine the best base cases. These parameters are summarized in Table 2 below. The centralized cache yielded best performance for a 4-way word-interleaved 32 kB cache. Such a cache has a bandwidth of four accesses per cycle and an access time of six cycles. The best decentralized cache organization has a single-ported four-cycle 16 kB bank in each cluster.

TABLE 2

| Parameter | Centralized cache | Decentralized cache | |
|---|---|---|---|
| | | each cluster | total |
| Cache size | 32 KB | 16 KB | 16N KB |
| Set-associativity | 2-way | 2-way | 2-way |
| Line size | 32 bytes | 8 bytes | 8N bytes |
| Bandwidth | 4 words/cycle | 1 word/cycle | N words/cycle |
| RAM look-up time | 6 cycles | 4 cycles | 4 cycles |
| LSQ size | 15N | 15 | 15N |

As a benchmark set, we used four SPEC2k Integer programs, three SPEC2k FP programs, and two programs from the UCLA Mediabench. The details on these programs are listed in Table 3 below. The programs represent a mix of various program types, including high and low IPC codes, and those limited by memory, branch mispredictions, etc. Most of these programs were fast forwarded through the first two billion instructions and simulated in detail to warm the various processor structures before measurements were taken. While we are simulating an aggressive processor model, not all our benchmark programs have a high IPC. Note that an aggressive processor design is motivated by the need to run high IPC codes and by the need to support multiple threads. In both cases, the quick completion of a single low-IPC thread is still important—hence the need to include such programs in the benchmark set.

TABLE 3

| Benchmark | Input dataset | Simulation window | Base IPC | Mispred branch interval |
|---|---|---|---|---|
| cjpeg (Mediabench) | testimg | 150 M-250 M | 2.06 | 82 |
| crafty (SPEC2k Int) | ref | 2000 M-2200 M | 1.85 | 118 |
| djpeg (Mediabench) | testimg | 30 M-180 M | 4.07 | 249 |
| galgel (SPEC2k FP) | ref | 2000 M-2300 M | 3.43 | 88 |
| gzip (SPEC2k Int) | ref | 2000 M-2100 M | 1.83 | 87 |
| mgrid (SPEC2k FP) | ref | 2000 M-2050 M | 2.28 | 8977 |
| parser (SPEC2k Int) | ref | 2000 M-2100 M | 1.42 | 88 |
| swim (SPEC2k FP) | ref | 2000 M-2050 M | 1.67 | 22600 |
| vpr (SPEC2k Int) | ref | 2000 M-2100 M | 1.20 | 171 |

Figure 3:
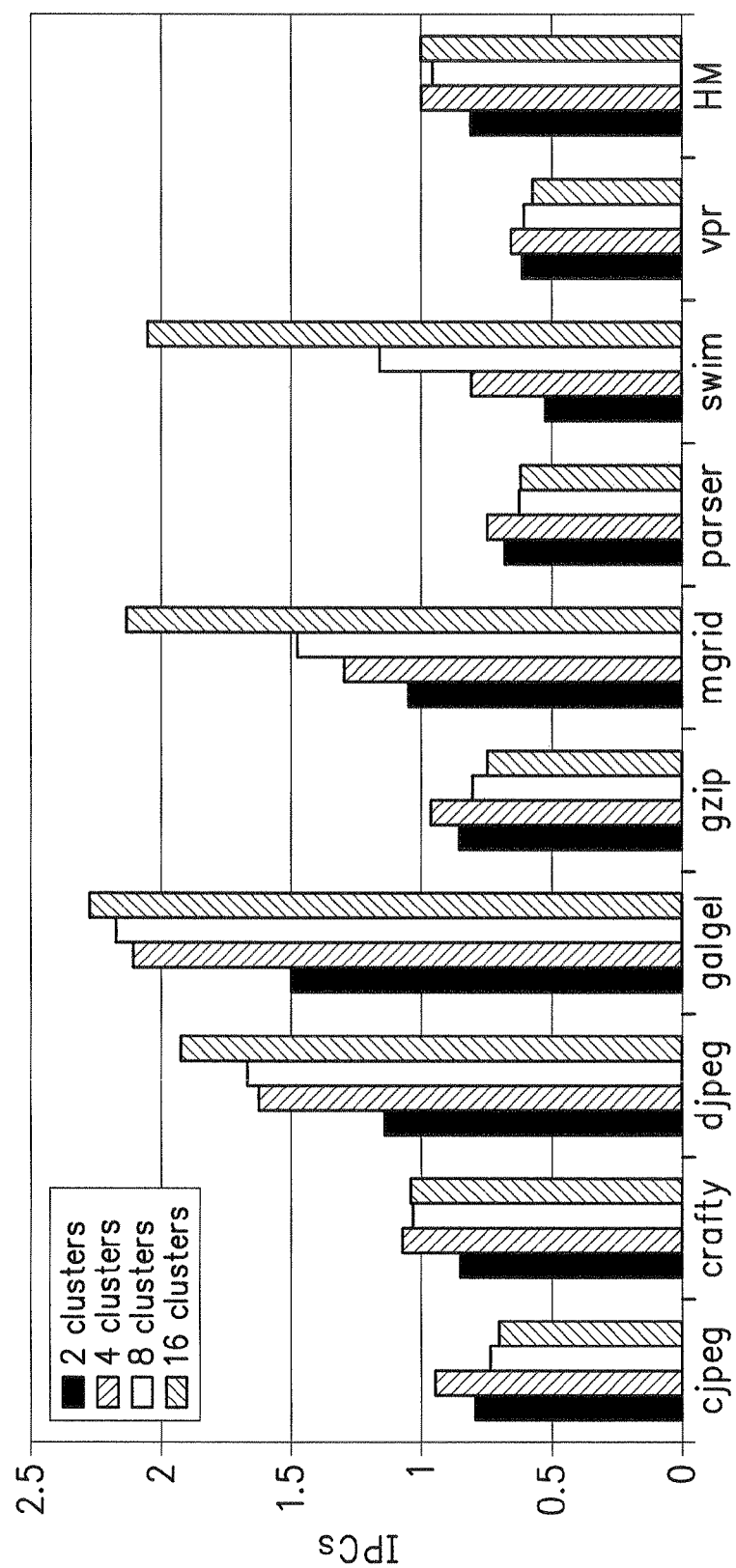
FIG. 3 is a graph showing IPC (instructions per cycle) performance for fixed cluster organizations.

For brevity, we focus our initial analysis on the 16-cluster model with the centralized cache and the ring interconnect. FIG. 3 shows the effect of statically using a fixed subset of clusters for a program. Increasing the number of clusters increases the average distance of a load/store instruction from the centralized cache and the worst-case inter-cluster bypass delay, thereby greatly affecting the overall communication cost. Assuming zero inter-cluster communication cost for loads and stores improved performance by 31%, while assuming zero cost for register-to-register communication improved performance by 11%, indicating that increased load/store latency dominates the communication overhead. This latency could be reduced by steering load/store instructions to the cluster closest to the cache, but this would increase load imbalance and register communication. The average latency for inter-cluster register communication in the 16-cluster system was 4.1 cycles. At the same time, using more clusters also provides the program with more functional units, registers, and issue queue entries, thus allowing it to dispatch a larger window of in-flight instructions. Depending on which of these two conflicting forces dominates, performance either improves or worsens as the number of clusters is increased. Programs with distant ILP, like djpeg (JPEG decoding from Mediabench), swim, mgrid, and galgel (loop-based floating-point programs from SPEC2K) benefit from using many resources. On the other hand, most integer programs with low branch prediction accuracies can not exploit a large window of in-flight instructions. Hence, increasing the resources only degrades performance because of the additional communication cost. This is a phenomenon hitherto unobserved in a clustered processor (partly because very few studies have looked at more than four clusters and partly because earlier studies assumed no communication cost in accessing a centralized cache).

Our goal is to tune the hardware to the program's requirements by dynamically allocating clusters to the program. This can be achieved by modifying the steering heuristic to disallow instruction dispatch to the disabled clusters. In other words, disabling is equivalent to not assigning any new instructions to the cluster. Instructions already assigned to the disabled clusters are allowed to complete, resulting in a natural draining of the cluster.

At the start of each program phase, we run each configuration option for an interval and record the IPCs. We then pick the configuration with the highest IPC and use it until the next phase change is detected. Such a mechanism is heavily reliant on the program's ability to sustain uniform performance over a number of intervals. We found that floating-point programs generally show this behavior, while the integer programs show a lot more variability. While earlier studies have assumed fixed interval lengths, we found that this would result in very poor performance for a number of programs. Hence, picking an appropriate interval length is fundamental to the success of a configuration selection algorithm (and can be universally applied to the configuration of other aspects of the processor in addition to the number of clusters).

To study the variability of program behavior over different intervals, we ran each of the programs for billions of instructions to generate a trace of various statistics at regular 10 K instruction intervals. We used three metrics to define a program phase—IPC, branch frequency, and frequency of memory references. At the start of each program phase, the statistics collected during the first interval were used as reference. For each ensuing interval, if the three metrics for that interval were similar to the reference points, the interval was termed 'stable'. If any of the three metrics was significantly different, we declared the interval as 'unstable' and began a new program phase. This analysis was done for many interval lengths. The instability factor for an interval length is the percentage of intervals that were considered 'unstable', i.e., the frequency of the occurrence of a phase change. In our study, we found that it was sufficient to only explore a limited subset of the possible configurations (2, 4, 8, and 16 clusters) as they covered most of the interesting cases. An instability factor of 5% ensures that less than 15% of the intervals are in sub-optimal configurations.

Table 4 below shows the smallest interval length that affords an acceptable instability factor of less than 5% for each of our programs. As can be seen, the interval lengths that emerge as the best vary from 10 K to 40M. We also show the instability factor for a fixed interval length of 10 K instructions. Clearly, this interval length works poorly for a number of programs and would result in quite unacceptable performance. Most programs usually show consistent behavior across intervals for a coarse enough interval length, making interval-based schemes very robust and universally applicable. Even a program like parser, whose behavior varies dramatically based on the input data, has a low instability factor for a large 40 M instruction interval.

TABLE 4

| Benchmark | Minimum acceptable interval length and its instability factor | Instability factor for a 10K instruction interval |
|---|---|---|
| gzip | 10K/4% | 4% |
| vpr | 320K/5% | 14% |
| crafty | 320K/4% | 30% |
| parser | 40M/5% | 12% |
| swim | 10K/0% | 0% |
| mgrid | 10K/0% | 0% |
| galgel | 10K/1% | 1% |
| cjpeg | 40K/4% | 9% |
| djpeg | 1280K/1% | 31% |

In order to arrive at the optimal instruction interval length at run-time, we use a simple algorithm. We start with the minimum instruction interval. If the instability factor is too high, we double the size of the interval and repeat this until we either experience a low instability factor or reach a pre-specified limit (say, a billion instructions). If we reach the limit, we cease to employ the selection algorithm and pick the configuration that was picked most often.

Once we pick an interval length, we need not remain at that interval length forever. The program might move from one large macrophase to another that might have a completely different optimal instruction interval. To deal with this, we can continue to hierarchically build phase detection algorithms. An algorithm that inspects statistics at a coarse granularity (say, every 100 billion instructions) could trigger the detection of a new macrophase, at which point, we would restart the selection algorithm with a 10 K interval length and find the optimal interval length all over again.

For completeness, in the code listing below, we describe our algorithm that selects the interval length, detects phases, and selects the best configuration at run-time. At the start of a phase, the statistics collected in the first interval serve as a reference point against which to compare future statistics and detect a phase change. The branch and memory reference frequencies are microarchitecture-independent parameters and can be used to detect phase changes even during the exploration process. After exploration, the best performing configuration is picked and its IPC is also used as a reference. A phase change is signaled if either the number of branches, the number of memory references, or the IPC differs significantly from the reference point. Occasionally, there is a slight change in IPC characteristics during an interval (perhaps caused by a burst of branch mispredicts or cache misses), after which, behavior returns to that of the previous phase. To discourage needless explorations in this scenario, we tolerate some noise in the IPC measurements (with the num ipc variations parameter). In addition, if phase changes are frequent, the instability variable is incremented and eventually, the interval length is doubled.

Run-Time Algorithm for Dynamic Selection of Number of Clusters

Initializations and Definitions:

```
interval_length = 10K; (number of committed instrs before invoking the
    algo)
discontinue_algorithm = FALSE; (if this is set, no more reconfigurations
    are attempted until the next macrophase)
have_reference_point = FALSE; (the first interval in a new phase
provides
    a reference point to compare future intervals)
significant_change_in_ipc; (this is set if the IPC in the current interval
    differs from that in the reference point by more than 10%)
significant_change_in_memrefs; (this is set if the memory references in
    the current interval differs from the reference point by more
    than interval_length/100)
significant_change_in_branches; (similar to
significant_change_in_memrefs)
num_ipc_variations = 0; (this indicates the number of times there was a
    significant_change_in_ipc)
stable_state = FALSE; (this is set only after all configs are explored)
num_clusters; (the number of active clusters)
instability = 0; (number indicating phase change frequency)
THRESH1 = THRESH2 = 5; THRESH3 = 1 billion instructions;
Inspect statistics every 100 billion instructions.
If (new macrophase)
    Initialize all variables;
If (not discontinue_algorithm)
    Execute the following after every interval_length instructions;
If (have_reference_point)
If (significant_change_in_memrefs or
significant_change_in_branches or
    significant_change_in_ipc and num_ipc_variations > THRESH1))
    have_reference_point = stable_state = FALSE;
    num_ipc_variations = 0;
    num_clusters = 4;
    instability = instability + 2;
```

```
    if (instability > THRESH2)
        interval_length = interval_length * 2;
        instability = 0;
    if (interval_length > THRESH3)
        Pick most popular configuration; discontinue_algorithm =
        TRUE;
    else
        if (significant_change_in_ipc)
            if (stable_state) num_ipc_variations –
num_ipc_variations +2;
        else
            num_ipc_variations =
            MAX( 2,num_ipc_variations 0.125);
    instability = instability 0.125;
else
    have_reference_point = TRUE;
    Record branches and memrefs.
If (have_reference_point and not stable_state)
    record IPC;
    num_clusters = num_clusters * 2;
    if (num_clusters > 16)
        pick the best performing configuration;
        make its IPC the IPC_reference_point;
        stable_state = TRUE;
```

This entire process of run-time reconfiguration can be implemented in software with support from hardware event counters. A low-overhead software routine (like that used for software TLB miss handling) that inspects various hardware counters before making a decision on the subsequent configuration is invoked at every interval. The algorithm amounts to about 100 assembly instructions, only a small fraction of which are executed at each invocation. Even for the minimum interval length of 10 K instructions, this amounts to an overhead of much less than 1%. Implementing the selection algorithm in software allows greater flexibility and opens up the possibility for application-specific algorithms. Algorithms at higher levels that detect changes in macrophases have an even lower overhead. Since the algorithm runs entirely in software, most program-specific state resides in memory as opposed to hardware registers. Hence, apart from the event counters, no additional state has to be saved and restored on a context switch.

Figure 4:
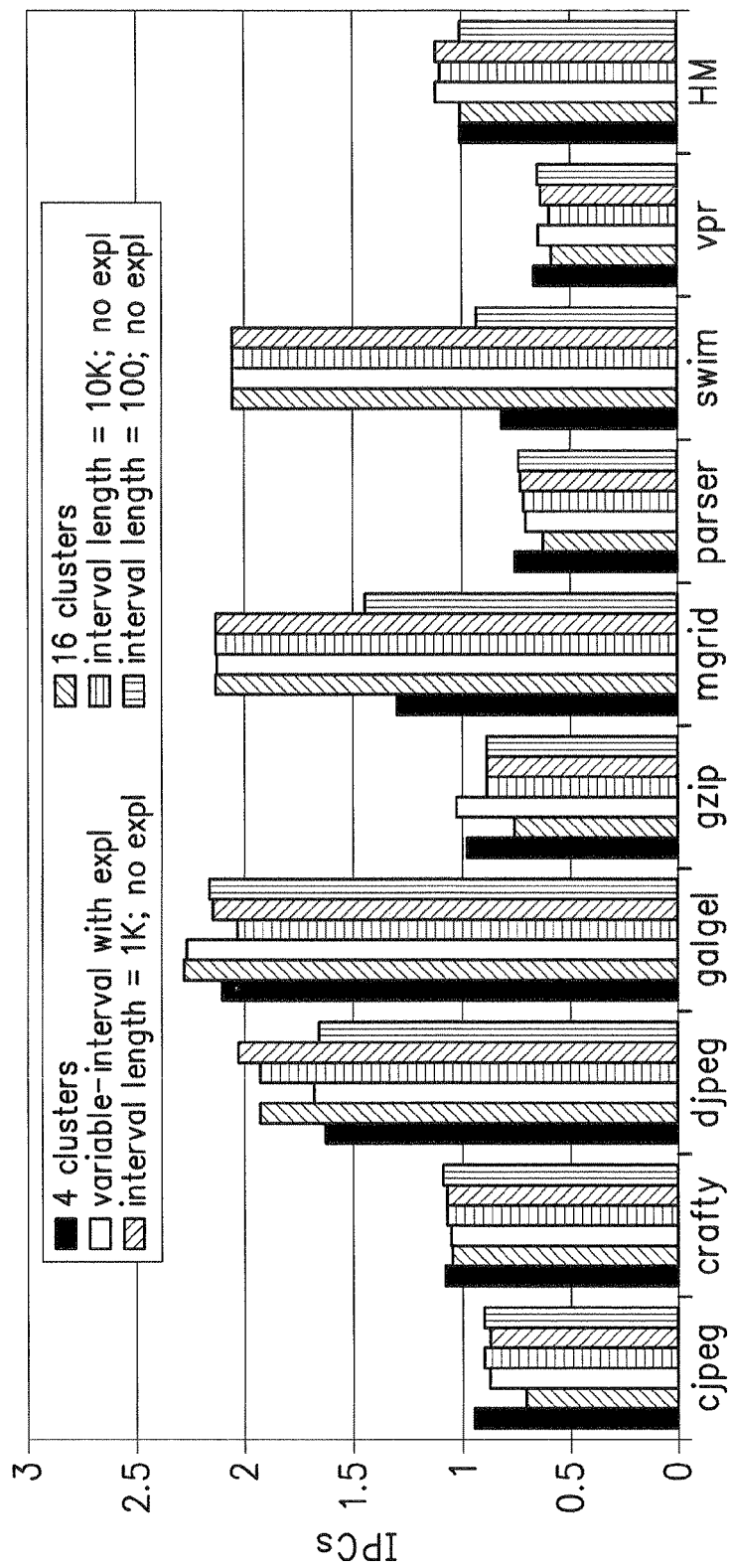
FIG. 4 is a graph showing IPC performance for base cases and for interval-based schemes.

Results will now be presented. In FIG. 4, the third bar illustrates the impact of using the interval-based selection mechanism with exploration at the start of each program phase. As reference points, the first two bars show the static organizations with four and 16 clusters. We see that in almost all cases, the dynamic scheme does a very good job in approximating the performance of the best static organization. For floating-point programs with little instability (galgel, mgrid, swim), the dynamic scheme easily matches the hardware to the program's requirements. For the integer programs, in most cases, there is an initial unstable period when the interval size is inappropriate. Consistent with our earlier analysis, the interval size is increased until it settles at one that allows an instability factor of less than 5%. In parser, the simulation interval was not long enough to allow the dynamic scheme to settle at the required 40M instruction interval.

In djpeg, it takes a number of intervals for the interval size to be large enough (1.28M instructions) to allow a small instability factor. Further, since the interval length is large, many opportunities for reconfiguration are missed. There are small phases within each interval where the ILP characteristics are different. For these two reasons, the dynamic scheme falls short of the performance of the fixed static organization with 16 clusters for djpeg.

In the case of gzip, there are a number of prolonged phases, some with distant ILP characteristics, and others with low amounts of distant ILP. Since the dynamic scheme picks the best configuration at any time, its performance is better than even the best static fixed organization. On average, 8.3 of the 16 clusters were disabled at any time across the benchmark set. In the absence of any other workload, this produces a great savings in leakage energy, provided the supply voltage to these unused clusters can be turned off. Likewise, for a multi-threaded workload, even after optimizing single-thread performance, more than eight clusters still remain for use by the other threads.

Overall, the dynamic interval-based scheme with exploration performs about 11% better than the best static fixed organization. It is also very robust—it applies to every program in our benchmark set as there is usually a coarse enough interval length such that behavior across those intervals is fairly consistent. However, the downside is the inability to target relatively short phases. We experimented with smaller initial interval lengths, but found that the dynamic scheme encountered great instability at these small interval lengths, and hence, the interval lengths were increased to a larger value just as before. This is caused by the fact that measurements become noisier as the interval size is reduced and it is harder to detect the same program metrics across intervals and accordingly identify the best configuration for any phase.

To alleviate these problems, we attempted an alternative interval-based scheme. Instead of exploring various configurations at the start of each program phase, we used a 16-cluster configuration for an interval and based on the degree of available distant ILP, we selected either a four or 16-cluster configuration for subsequent intervals until the next phase change (our earlier results indicate that these are the two most meaningful configurations and cover most cases). An instruction is marked as distant if it is at least 120 instructions younger than the oldest instruction in the ROB. At the time of issue, the instruction sets a bit in its ROB entry if it is distant. At the time of commit, this bit is used to increment the 'degree of distant ILP'. Since each cluster has 30 physical registers, four clusters are enough to support about 120 in-flight instructions. If the number of distant instructions issued in an interval exceeds a certain threshold, it indicates that 16 clusters would be required to exploit the available distant ILP. In our experiments, we use a threshold value of 160 for an interval length of 1000. Because there is no exploration phase, the hardware reacts quickly to a program phase change and reconfiguration at a finer granularity becomes meaningful. Hence, we focus on small fixed instruction intervals and do not attempt to increase the interval length at run-time. However, since the decision is based on program metrics instead of exploration, some accuracy is compromised. Further, the smaller the interval length, the faster the reaction to a phase change, but the noisier the measurements, resulting in some incorrect decisions.

FIG. 4 also shows results for such a mechanism for three different fixed interval lengths. An interval length of 1 K instructions provides the best trade-off between accuracy and fast reactions to phase changes. Overall, it shows the same 11% improvement over the best static base case. However, in a program like djpeg, it does much better (21%) than the interval-based scheme with exploration because of its ability to target small phases with different requirements. Unfortunately, it takes a performance hit in programs like galgel and gzip because the small interval-length and the noisy measurements result in frequent phase changes and inaccurate decision-making.

One of the primary reasons for this is the fact that the basic blocks executed in successive 1000 instruction intervals are not always the same. As a result, frequent phase changes are signaled and each new phase change results in an interval with 16 clusters, to help determine the distant ILP. To alleviate this problem, we examine a fine-grain reconfiguration scheme at basic block boundaries.

To allow reconfiguration at a fine granularity, we look upon every branch as a potential phase change. We need to determine if a branch is followed by a high degree of distant ILP, in which case, dispatch should continue freely, else, dispatch should be limited to only the first four clusters. Exploring various configurations is not a feasible option as there are likely to be many neighboring branches in different stages of exploration resulting in noisy measurements for each branch. Hence, until we have enough information, we assume dispatch to 16 clusters and compute the distant ILP characteristics following every branch. This is used to update a reconfiguration table so that when the same branch is later encountered, it is able to pick the right number of clusters. If we encounter a branch with no entry in the table, we assume a 16-cluster organization so that we can determine its degree of distant ILP.

Assuming that four clusters can support roughly 120 instructions, to determine if a branch is followed by distant ILP, we need to identify how many of the 360 committed instructions following a branch were distant when they issued. Accordingly, either four or 16 clusters would be appropriate. To effect this computation, we keep track of the distant ILP nature of the 360 last committed instructions. A single counter can be updated by the instructions entering and leaving this queue of 360 instructions so that a running count of the distant ILP can be maintained. When a branch happens to be the oldest of these 360 instructions, its degree of distant ILP is indicated by the value in the counter.

There is likely to still be some interference from neighboring branches. To make the mechanism more robust, we sample the behavior for a number of instances of the same branch before creating an entry for it in the reconfiguration table. Further, we can fine-tune the granularity of reconfiguration by attempting changes only for specific branches. For example, we found that best performance was achieved when we attempted changes for only every fifth branch. We also show results for a mechanism that attempts changes only at subroutine calls and returns. We formalize the algorithm below:

Algorithm for Every N-th Branch

At Every Nth Branch, Look Up the Reconfig Table.

```
If entry found, change to advised configuration.
Else, use 16 clusters.
While removing a branch from the queue of 360
committed instrs,
    If M samples of this branch have been seen,
        Do not update table.
    Else,
        Record the latest sample.
        If this is the Mth sample,
            compute the advised configuration.
    Else,
        advised configuration is 16 clusters.
```

The downside of the approach just described is the fact that initial measurements dictate future behavior. The nature of the code following a branch could change over the course of the program. It might not always be easy to detect such a change, especially if only four clusters are being used and the degree of distant ILP is not evident. To deal with this situation, we flush the reconfiguration table at periodic intervals. We found that re-constructing the table every 10M instructions resulted in negligible overheads.

Figure 5:
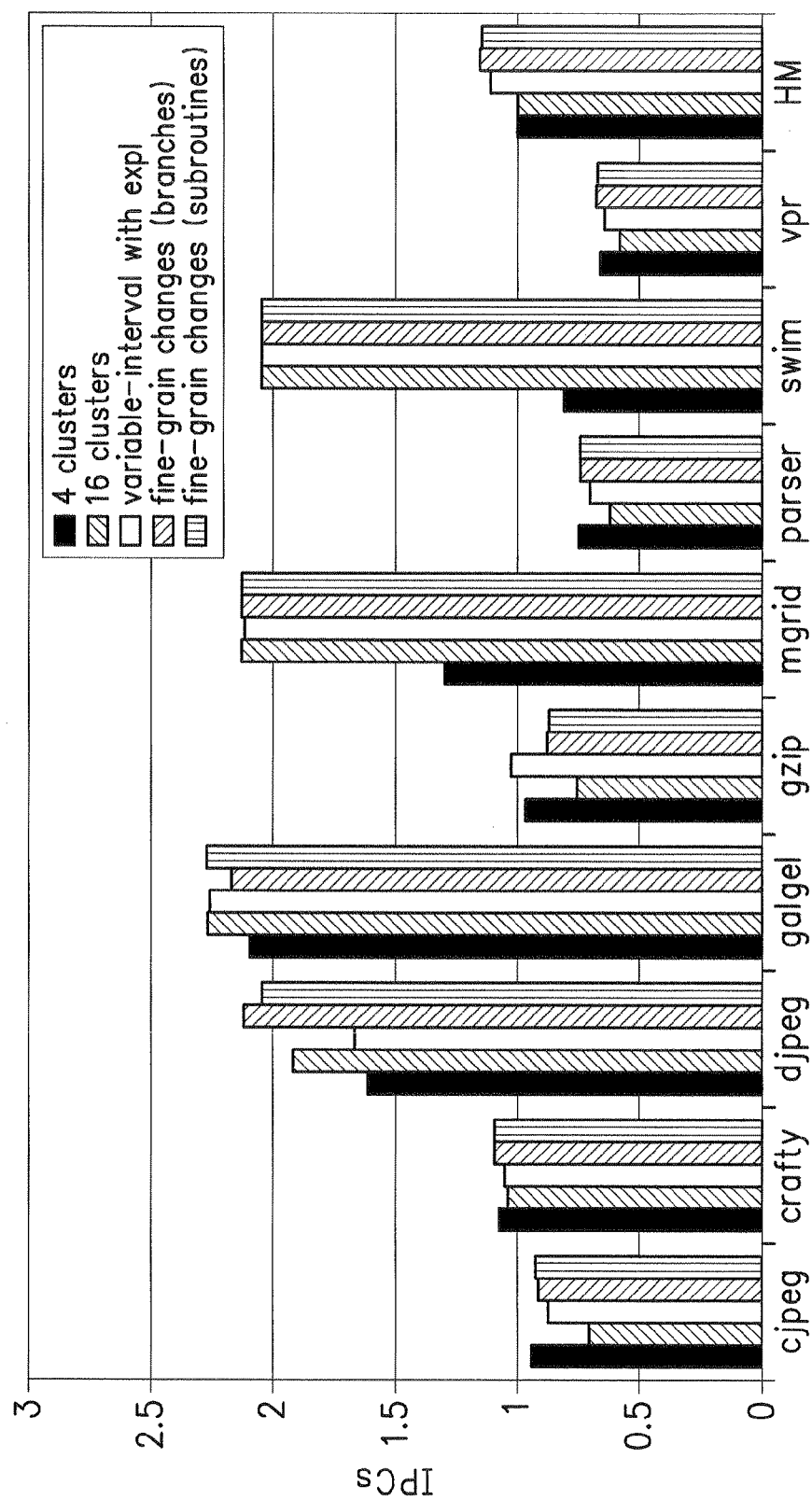
FIG. 5 is a graph showing IPC performance for the base cases, an interval-based algorithm with exploration, and two fine-grained exploration schemes.

In FIG. 5, in addition to the base cases and the interval-based scheme with exploration, we show IPCs for two fine-grained reconfiguration schemes. The first attempts reconfiguration at every 5th branch and creates an entry in the table after collecting 10 samples for each branch. To eliminate effects from aliasing, we use a large 16 K-entry table, though, in almost all cases, a much smaller table works as well. The second scheme attempts changes at every subroutine call and return and uses three samples. The figure indicates that the ability to quickly react to phase changes results in improved performance in programs like djpeg, cjpeg, crafty, parser, and vpr. The maximum number of changes between configurations was observed for crafty (1.5 million). Unlike in the interval-based schemes with no exploration, instability is not caused by noisy measurements. However, gzip fails to match the performance achieved by the interval-based scheme. This is because the nature of the code following a branch changes over the course of the program. Hence, our policy of using initial measurements to pick a configuration for the future is not always accurate. The same behavior is observed to a lesser extent in galgel. Overall, the fine-grained schemes yield a 15% improvement over the base cases, compared to the 11% improvements seen with the interval-based schemes.

From these results, we conclude that interval-based schemes with exploration are easy to implement, robust, and provide most of the speedups possible. Because of their tendency to pick a coarse interval length, a number of reconfiguration opportunities are missed. Choosing a small interval length is not the solution to this because of noisy measurements across successive small intervals. To allow fine-grained reconfigurations, we pick basic block boundaries as reconfiguration points and use initial measurements to predict future behavior. Except for gzip, such an approach does not trade off much accuracy and the hardware is able to quickly adapt to the program's needs. However, to get this additional 4% improvement, we have to invest some non-trivial amount of hardware—a table to keep track of the predictions and logic to maintain the distant ILP metric.

The decentralized cache model will now be described, first with regard to the clustered LSQ implementation. In the decentralized cache model, if an effective address is known when a memory instruction is renamed, then it can be directed to the cluster that caches the corresponding data. However, the effective address is generally not known at rename time, requiring that we predict the bank that this memory operation is going to access. Based on this prediction, the instruction is sent to one of the clusters. Once the effective address is computed, appropriate recovery action has to be taken in the case of a bank misprediction.

If the operation is a load, recovery is simple—the effective address is sent to the correct cluster, where memory conflicts are resolved in the LSQ, data is fetched from the cache bank, and returned to the requesting cluster. If the memory operation is a store, the misdirection could result in correctness problems. A load in a different cluster could have proceeded while being unaware of the existence of a mis-directed store to the same address. To deal with this problem, we adopt the following policy. While renaming, a store whose effective address is unknown is assigned to a particular cluster (where its effective address is computed), but at the same time, a dummy slot is also created in the other clusters. Subsequent loads behind the dummy slot in other clusters are prevented from proceeding because there is an earlier store with an unresolved address that could potentially cause conflicts. Once the effective address is computed, the information is broadcast to all the clusters and the dummy slots in all the LSQs except one are removed. The broadcast increases the traffic on the interconnect for register and cache data (which we model).

Regarding the bank prediction, earlier work had proposed the use of branch-predictor-like tables to predict the bank accessed by a load or store. In our simulations, we use a two-level bank predictor with 1024 entries in the first level and 4096 entries in the second.

Regarding the steering heuristics, in a processor with a decentralized cache, the steering heuristic has to handle three data dependences for each load or store—the two source operands and the bank that caches the data. Since the transfer of cache data involves two communications (the address and the data), performance is maximized when a load or store is steered to the cluster that is predicted to cache the corresponding data (note that unlike in the centralized cache model, doing so does not increase load imbalance as the cache is not at a single location). Even so, frequent bank mispredictions and the increased traffic from store address broadcasts seriously impact performance. Ignoring these effects improved performance by 29%. At the same time, favoring the dependence from the cache bank results in increased register communication. Assuming free register communication improved performance by 27%. Thus, register and cache traffic contribute equally to the communication bottleneck in such a system.

So far, our results have assumed a clustered processor with a centralized cache. Hence, reconfiguration is only a matter of allowing the steering heuristic to dispatch to a subset of the total clusters. With a decentralized cache, each cluster has a cache bank associated with it. Data is allocated to these cache banks in a word-interleaved manner. In going from 16 to four clusters, the number of cache banks and hence, the mapping of data to physical cache lines changes. To fix this problem, the least complex solution is to stall the processor while the L1 data cache is flushed to L2. Fortunately, the bank predictor need not be flushed. With 16 clusters, the bank predictor produces a 4-bit prediction. When four clusters are used, the two lower order bits of the prediction indicate the correct bank.

Figure 6:
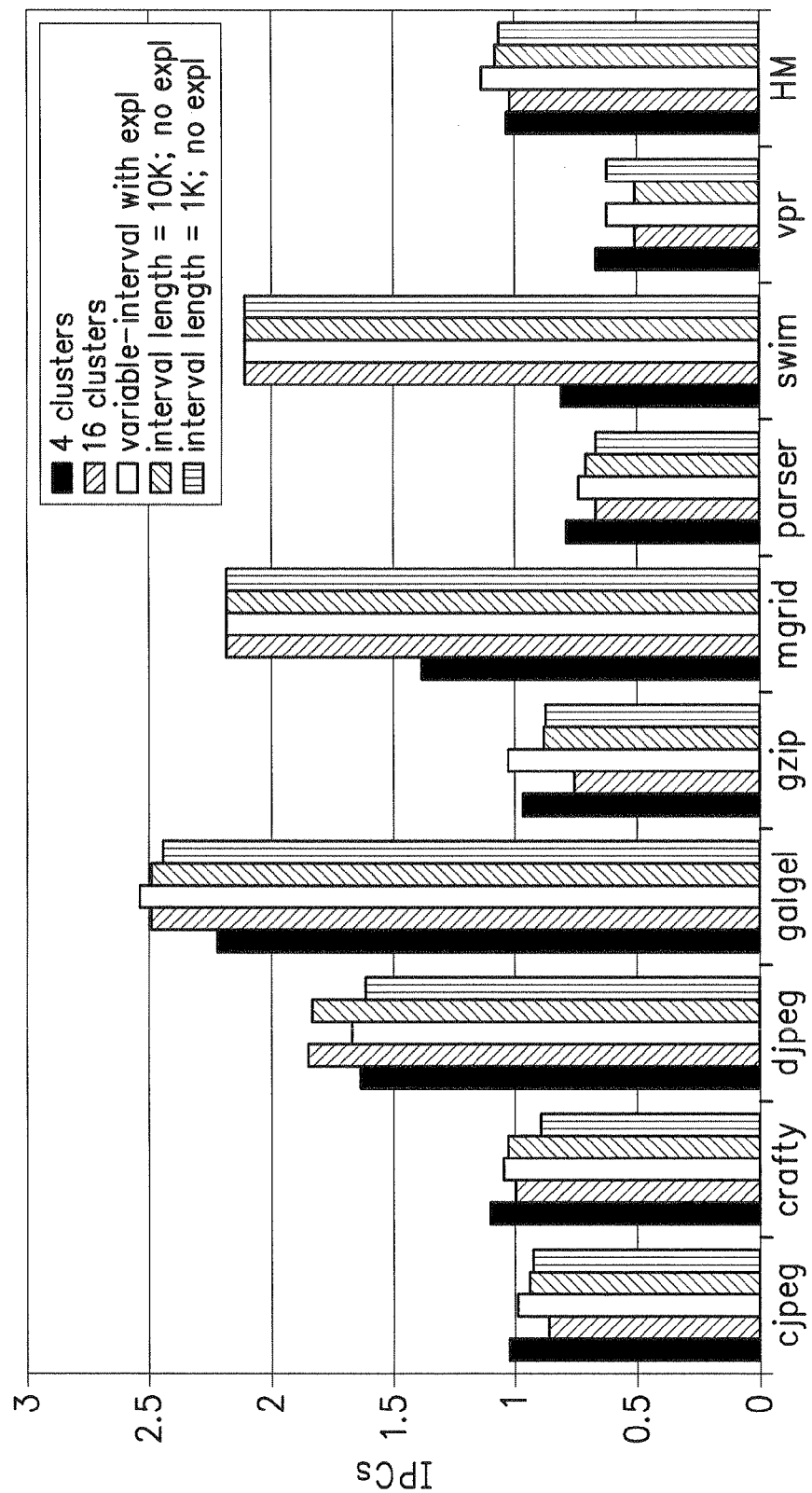
FIG. 6 is a graph showing IPC performance for dynamic interval-based mechanisms for the processor model with the decentralized cache.

Because the indexing of data to physical cache locations changes, reconfiguration is not as seamless as in the centralized cache model. Every reconfiguration requires a stall of the processor and a cache flush. Hence, the fine-grained reconfiguration schemes from the earlier section do not apply. FIG. 6 shows IPCs for the base cases and the interval-based mechanisms. The third bar shows the scheme with exploration and a minimum interval length of 10 K instructions. The fourth and fifth bars show interval-based schemes with no exploration and the use of distant ILP metrics to pick the best configuration. The simulation parameters for the decentralized cache are summarized in Table 2. We find that the results trend is similar to that seen before for the centralized cache model. Except in the case of djpeg, there is no benefit from reconfiguring using shorter intervals. Overall, the interval-based scheme with exploration yielded a 10% speedup over the base cases.

Since the dynamic scheme attempts to minimize reconfigurations, cache flushes are kept to a minimum. Vpr encountered the maximum number of writebacks due to flushes (400 K), which resulted in a 1% IPC slowdown. Overall, these flushes resulted in a 0.3% IPC degradation.

Our results have shown that the communication-parallelism trade-off greatly affects the scalability of different programs as the number of clusters is increased for two important cache organizations. In this section, we confirm the applicability of our dynamic reconfiguration algorithms to other meaningful base cases. Some of the key parameters that affect the degree of communication and the degree of distant ILP are the choice of interconnect between the clusters, the latency of communication across a hop, the number of functional units in each cluster, and the number of instructions that can be supported by each cluster (the number of registers and issue queue entries per cluster).

Figure 7:
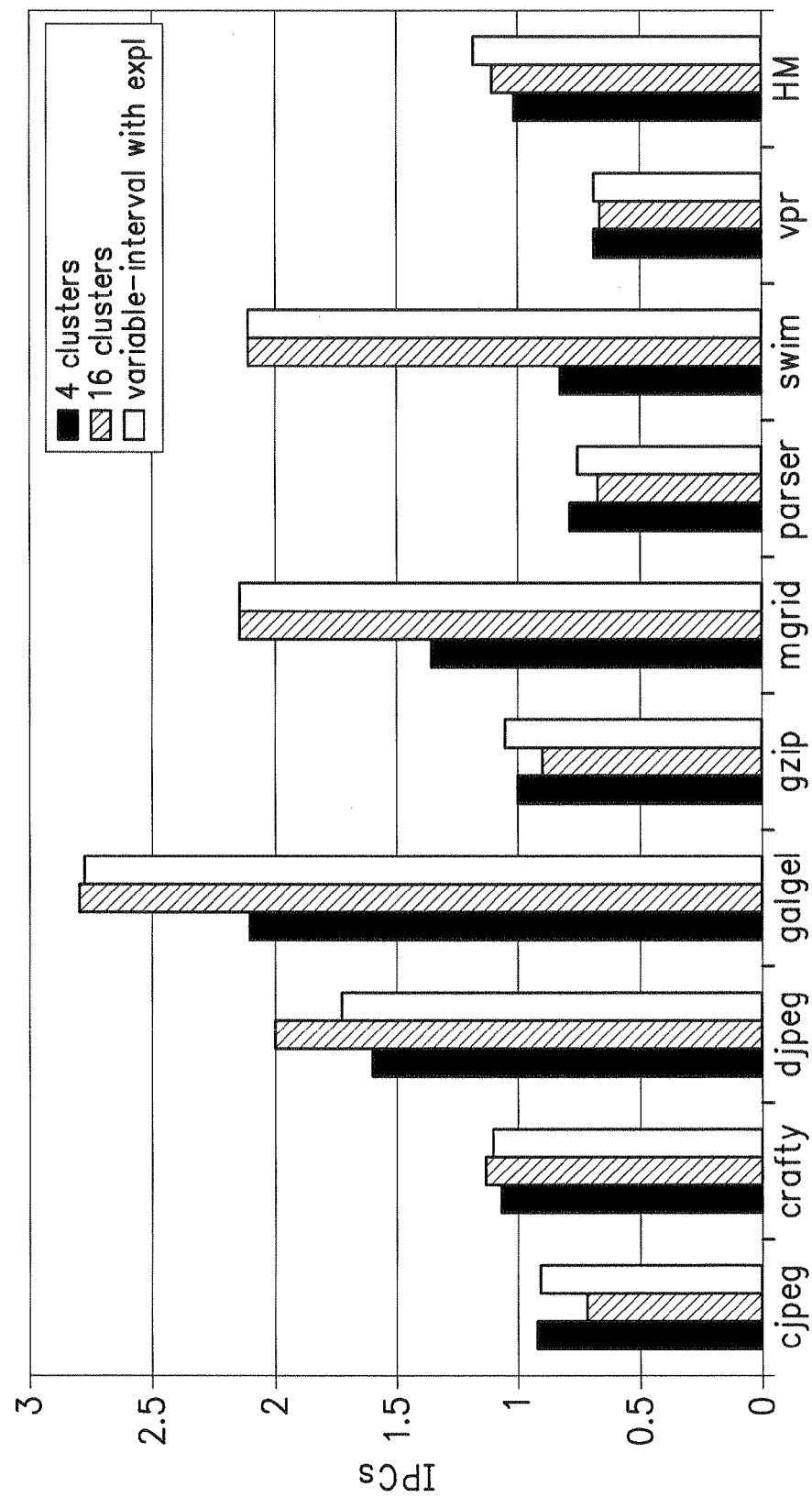
FIG. 7 is a graph showing IPC performance for a dynamic interval-based mechanism for the processor model with the grid interconnect.

FIG. 7 shows the effect of using a grid interconnect with a centralized cache model. Because of the better connectivity, the communication is less of a bottleneck and the performance of the 16-cluster organization is 8% better than that of the 4-cluster system. For brevity, we only show results with the interval-based scheme with exploration. The trend is as seen before, but because the communication penalty is not as pronounced, the overall improvement over the best base case is only 7%. The use of fine-grained reconfiguration techniques yields qualitatively similar results as with the ring interconnect.

We also studied the sensitivity of the results to the sizes of various resources within a cluster. We studied the effect of using fewer (10 issue queue entries and 20 registers per cluster) and more resources (20 issue queue entries and 40 registers per cluster). When there are few resources per cluster, more clusters are required, on average, to exploit the available parallelism. Hence, the 16-cluster system is a favorable base case and the improvement of the interval-based dynamic mechanism relative to it is only 8%. When there are more resources per cluster, using a few clusters for low-ILP phases is highly beneficial. As a result, the improvement over the 16-cluster base is 13%. Doubling the cost of communication across each hop results in a highly communication-bound 16-cluster system. By employing the dynamic mechanism and using fewer clusters for low-ILP phases, a 23% performance improvement was seen.

These results are qualitatively similar to the improvements seen with the interval-based schemes in the earlier subsections, indicating that the dynamically tunable design can help improve performance significantly across a wide range of processor parameters. Thus, the communication-parallelism trade-off and its management are likely to be important in most processors of the future.

While a preferred embodiment and variations thereon have been described above, those skilled in the art who have reviewed the present disclosure will readily appreciate that other embodiments can be realized within the scope of the present invention. For example, numerical values are illustrative rather than limiting, as are the specifics of the algorithms used. Therefore, the present invention should be construed as limited only by the appended claims.

We claim:

1. An apparatus comprising:
   means for monitoring at least one program statistic at predetermined intervals of a program;
   means for determining a start of at least one of a plurality of phases of the program by comparing the monitored at least one program statistic to a predetermined reference;
   means for identifying at least one of the plurality of clusters to execute instructions corresponding to the at least one of the plurality of phases of the program by comparing the monitored at least one program statistic to the predetermined reference; and means for sending the instructions corresponding to the least one phase of the plurality of phases of the program only to the identified at least one of the plurality of clusters;
where the means for identifying the at least one of the plurality of clusters includes:
means for determining a plurality of intervals in each of the plurality of phases;
means for detecting a degree of available distant instruction-level parallelism during a first one of the intervals; and
means for identifying the at least one of the clusters responsive to the degree of available instant instruction-level parallelism.

2. The apparatus of claim 1 where the means for identifying the at least one of the plurality of clusters is configured to operate at every N-th branch where N is a whole number.

3. The apparatus of claim 1 where the means for identifying the at least one of the plurality of clusters is configured to operate at every subroutine call and return.

4. A method for operating a processor including a plurality of clusters, the method comprising:
monitoring at least one program statistic at predetermined intervals of a program;
determining a start of at least one of a plurality of phases of the program by comparing the monitored at least one program statistic to a predetermined reference;
identifying a number of clusters to operate the at least one of the plurality of phases responsive to comparing the monitored at least one program statistic to the predetermined reference;
sending program instructions corresponding to the least one phase only to the number of clusters; and
repeating the monitoring, determining, identifying, and sending for each of the predetermined intervals.

5. The method of claim 4, wherein monitoring the at least one program statistic comprises selecting a length of the intervals.

6. A method for operating a processor including a plurality of clusters, comprising:
monitoring at least one program statistic at predetermined intervals of a program;
determining a start of at least one of a plurality of phases of the program by comparing the monitored at least one program statistic to a predetermined reference;
identifying at least one of the plurality of clusters to operate the at least one of the plurality of phases of the program on the processor responsive to the comparing the monitored at least one program statistic to the predetermined reference;
sending program instructions corresponding to the least one phase only to the identified at least one of the plurality of clusters; and
performing the identifying the at least one of the plurality of clusters at a start of each of the plurality of phases in the program;
wherein the identifying the at least one of the plurality of clusters comprises:
(i) identifying a plurality of intervals in each of the plurality of phases;
(ii) detecting program statistics from at least one of the plurality of intervals; and
(iii) selecting a number of the clusters from the program statistics responsive to the detecting the program statistics from the at least one of the plurality of intervals;
wherein detecting program statistics from the at least one of the plurality of intervals comprises selecting a length of the intervals; and
wherein selecting the length of the intervals includes selecting the length of the intervals by starting with a predetermined initial interval length and increasing the predetermined interval length until either a stability threshold is reached or a predetermined maximum interval length is reached.

7. A method for operating a processor that includes a plurality of clusters, comprising:
monitoring at least one program statistic at predetermined intervals of a program;
identifying a start of a program phase by comparing the at least one program statistic to a reference;
selecting only a number of clusters to execute instructions associated with the program phase responsive to the comparing the at least one program statistic to the reference; and
performing the selecting only the number of clusters at a start of each of the plurality of phases in the program;
wherein the selecting only the number of clusters comprises:
(i) determining a plurality of intervals in each of the plurality of phases;
(ii) detecting a degree of available distant instruction-level parallelism during a first one of the intervals; and
(iii) identifying the number of clusters responsive to the degree of available instant instruction-level parallelism.

8. The method of claim 7, wherein the selecting only the number of clusters is performed at every N-th branch where N is a whole number.

9. The method of claim 7, wherein the selecting only the number of clusters is performed at every subroutine call and return.

10. An apparatus comprising:
means for monitoring at least one program statistic at predetermined intervals of a program;
means for identifying a number of clusters to execute a plurality of instructions associated with a phase of the program responsive to determining a start of the phase by comparing the least one program statistic to a reference; and
means for sending the plurality of instructions only to the identified number of clusters.

11. An apparatus comprising:
means for monitoring at least one program statistic at predetermined intervals of a program;
means for determining a start of at least one of a plurality of phases of the program by comparing the monitored at least one program statistic to a predetermined reference;
means for identifying at least one of the plurality of clusters to execute instructions corresponding to the at least one of the plurality of phases of the program by comparing the monitored at least one program statistic to the predetermined reference; and
means for sending the instructions corresponding to the least one phase of the plurality of phases only to the identified at least one of the plurality of clusters;
where the means for identifying at least one of the plurality of clusters comprises:
means for identifying a plurality of intervals in each of the plurality of phases of the program;
means for detecting program statistics from at least one of the plurality of intervals; and means for identifying the at least one of the plurality of clusters from the program statistics responsive to the detecting the program statistics from at least one of the plurality of intervals;

where the means for detecting the program statistics from the at least one of the plurality of intervals comprises means for selecting a length of each of the intervals; and where the means for selecting the length of each of the intervals includes means for selecting the length of each of the intervals by starting with a predetermined initial interval length and increasing the length of each of the intervals until either a stability threshold is reached or a predetermined maximum interval length is reached.

12. The apparatus of claim 10 where the means for monitoring the at least one program statistic comprises means for selecting a length of the predetermined intervals.

* * * * *

UNITED STATES PATENT AND TRADEMARK OFFICE
CERTIFICATE OF CORRECTION

PATENT NO. : 7,490,220 B2  Page 1 of 1
APPLICATION NO. : 11/147392
DATED : February 10, 2009
INVENTOR(S) : Rajeev Balasubramonian It is certified that error appears in the above-identified patent and that said Letters Patent is hereby corrected as shown below:

Title page, item (76) Inventors, line 2, please delete "(US)" and insert -- (IN) --.

Title page, item (76) Inventors, line 4, please delete "(US)" and insert -- (IN) --.

At column 17, line 37, please delete "4," and insert -- 4 --.

At column 17, line 1, please delete "corresponding to the least one" and insert -- corresponding to the at least one --.

At column 17, line 33, please delete "corresponding to the least one" and insert -- corresponding to the at least one --.

At column 17, line 53, please delete "corresponding to the least one" and insert -- corresponding to the at least one --.

At column 18, line 59, please delete "corresponding to the least one" and insert -- corresponding to the at least one --.

At column 18, line 43, please delete "by comparing the least one program" and insert -- by comparing the at least one program --.

Signed and Sealed this

Twenty-ninth Day of June, 2010

David J. Kappos
*Director of the United States Patent and Trademark Office*